March 12, 1968     C. L. KELLER     3,372,596
METHOD AND DEVICE FOR MEASURING THE ROTATION OF A BODY
Filed Oct. 27, 1964     2 Sheets-Sheet 1

INVENTOR,
CHARLES L. KELLER

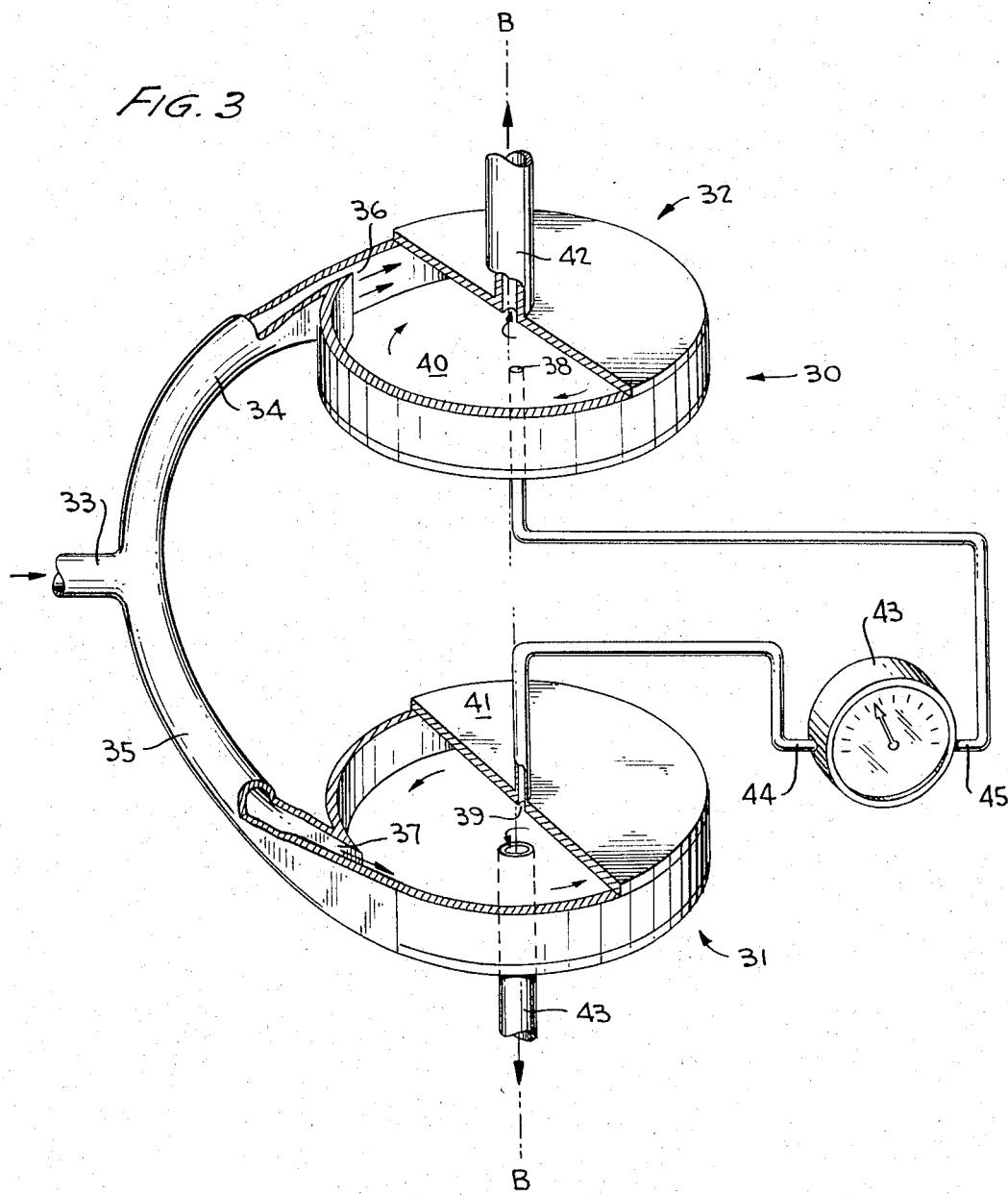

United States Patent Office 3,372,596
Patented Mar. 12, 1968

3,372,596
METHOD AND DEVICE FOR MEASURING THE ROTATION OF A BODY
Charles L. Keller, Silver Spring, Md., assignor to the United States of America as represented by the Secretary of the Army
Filed Oct. 27, 1964, Ser. No. 406,940
8 Claims. (Cl. 73—505)

ABSTRACT OF THE DISCLOSURE

An improved pure fluid rotation sensor utilizing a fluid vortex amplifier to measure the rate and direction of rotation. The fluid in a vortex chamber has a rotational motion imparted to it and a static pressure sensor is used to measure the tangential component of the fluid motion. Rotation of the chamber changes the tangential velocity of the fluid and the magnitude and direction of the rotation can be measured by observing the changes in pressure at the sensor. A pair of stacked fluid vortex amplifiers can be used for increased sensitivity.

---

Figure 1:
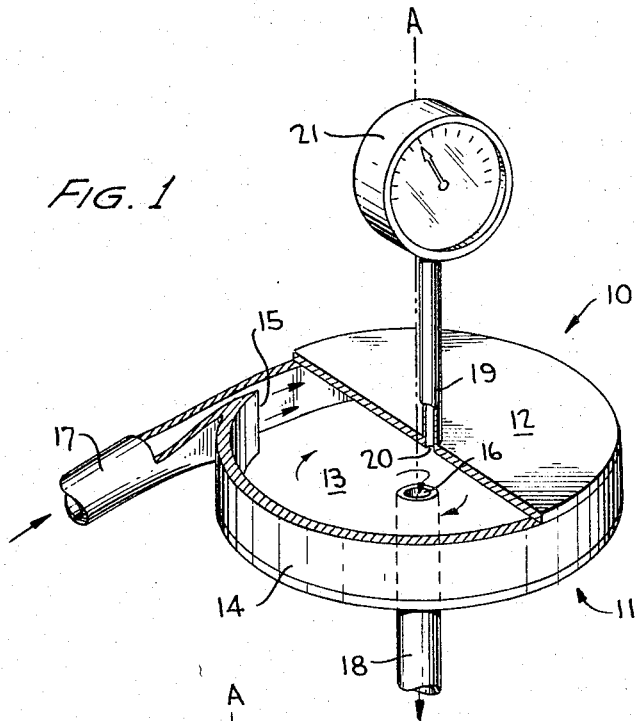

The invention described herein may be manufactured and used by or for the Government of the United States of America for governmental purposes without the payment to me of any royalty thereon.

This invention relates to rotation measuring methods and devices, and more particularly to an improved pure fluid rotation sensor that utilizes a fluid vortex amplifier to measure the rate and direction of rotation of missiles or other airborne vehicles, land vehicles, watercraft and the like.

Devices of this general type are disclosed in a copending application of Romald E. Bowles Ser. No. 171,538, filed Feb. 6, 1962, now Patent No. 3,320,815, and assigned to the same assignee as the present application. A rotation sensor of the type disclosed in the Bowles application employs a fluid vortex amplifier which operates on the basic vortex principle that the fluid velocity is inversely proportional to the radius. If a tangential component of velocity is imparted to a fluid near the circumference of a circular container having a relatively small central discharge hole, the flow is rotational and the tangential velocity component increases to a maximum at the hole thereby amplifying the initial velocity component. Thus, by providing a fluid vortex chamber secured to a body, its angular velocity may be detected by appropriately measuring the changes in the fluid flow leaving the chamber.

Considerable difficulty has been experienced in the Bowles type devices, particularly in the design of a suitable pickup to detect the variations in rotation, changes in angle, flow dynamic pressure or in the velocity or angular velocity of the issuing fluid. The design of the pickup is normally related to the velocity or angular velocity of the fluid, since the device operates on the vortex principle above.

It has been shown that both the static pressure and the dynamic pressure are related to the square of the velocity; more specifically, $p + \rho V^2$ is constant. It can also be shown that these pressures are an approximate function of the square of the ratio of the radii. Therefore, it is preferable to use pressure rather than velocity as a measure of rotation. Measurement of the dynamic pressure has proved to be rather complex, whereas measurement of the static pressure is straightforward, requires no special pickup design and does not disturb the fluid stream; however, measurement of the static pressure in the Bowles type sensor will indicate the magnitude of rotation, but not the direction.

Accordingly, it is an object of the present invention to provide a pure fluid rotation sensor having a simplified output signal system.

Another object of the invention is to provide a device for measuring the rate and direction of rotation that employs the features of a fluid vortex amplifier.

A further object of the instant invention is to provide a rotation measuring instrument that utilizes changes in the static pressure of the fluid in a vortex chamber as an indication of the rate and direction of rotation.

In accordance with one aspect of the invention, the foregoing and other objects are attained by employing a tangential flow in a fluid vortex chamber and taking static pressure measurements at a pickup located near the center of the chamber, at the point of maximum response. Rotation of the chamber about its axis in the direction of fluid flow increases the thrust on the fluid and increases its velocity V by an amount $\Delta V$. $V + \Delta V$ is multiplied by the "gain" of the particular geometry of the chamber and results in a lower static pressure at the pickup. Conversely, rotation of the chamber in an opposite direction will reduce the fluid velocity and increase the static pressure at the pickup. The pressure readings obtained during a rotation of the chamber are then compared to initial static pressure readings obtained at the pickup during non-rotation of the chamber, which will depend upon the initial tangential velocity of the fluid and the inlet and pickup radii. The pressure changes therefore are a measure of the magnitude and direction of the rotation.

Figure 2:
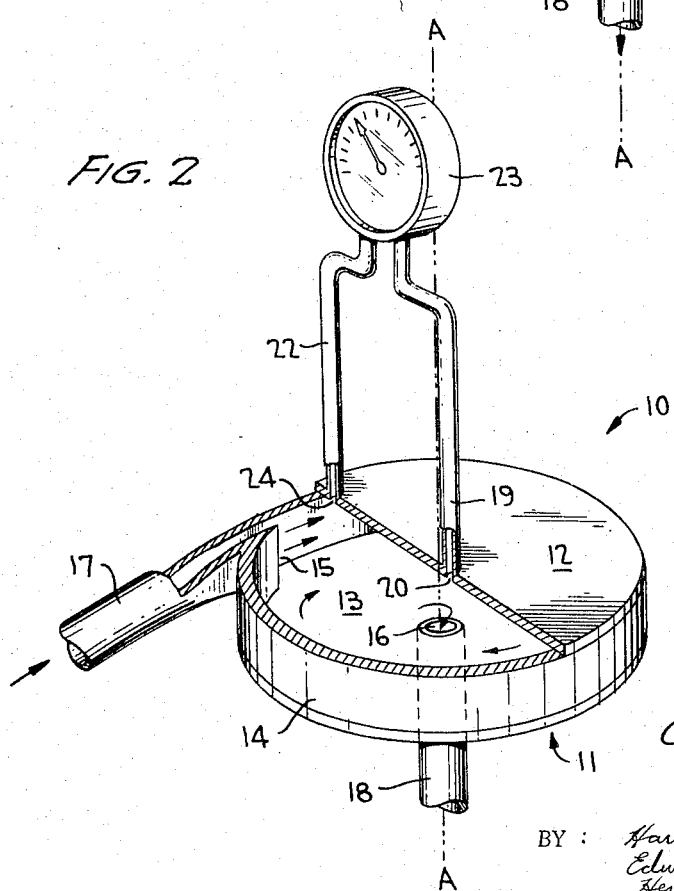

The specific nature of the invention, as well as other objects, aspects, uses and advantages thereof, will clearly appear from the following description and from the accompanying drawings, in which:

FIG. 1 is a perspective view, partly in section, of an embodiment according to the present invention, FIG. 2 is a perspective view, partly in section, of another embodiment of the invention, FIG. 3 is a perspective view, partly in section, of yet another embodiment of the invention incorporating a pair of the devices of FIG. 1.

Referring more particularly to the drawings, wherein like reference numerals indicate like parts throughout the several views, there is illustrated in FIG. 1 a rotation sensor of the present invention generally indicated by the reference numeral 10. The device employs a fluid vortex amplifier generally designated by the numeral 11, which comprises a relatively flat hollow cylindrical chamber having a circular top wall 12, a circular bottom wall 13 in spaced parallel relation thereto, and an annular side wall 14 secured in a fluid tight relation between the walls 12 and 13. Side wall 14 contains a slot-like fluid inlet port 15 that forms a tangential injection nozzle with the conduit 17. The cross-section of conduit 17 changes from circular to rectangular near the outer circumference of the chamber 11, so that the incoming fluid enters the chamber in a thin stream adjacent the inner periphery of wall 14 to keep turbulence to a minimum.

A central discharge opening or sink 16 is provided in bottom wall 13 and communicates with an axial drain pipe 18. A pressure pickup tube 19 pierces the chamber 11 through top wall 12 at a point slightly offset from the center of the chamber, terminating at one end at the inner surface of the top wall 12 to provide a pickup 20 and at the other end at a connection (not shown) to a suitable pressure measuring gage 21.

Fluid under pressure supplied to conduit 17 is injected into the chamber 11 via nozzle 15 in a tangential direction and leaves the chamber through the central discharge hole 16 thereby establishing vortical flow during all conditions of movement of the device. Static pressure measurements are taken at pickup 20 positioned at a minimum radius near the center of the vortical flow so as to obtain the maximum response from changes in the initial tangential velocity of the fluid according to the above mentioned vortex principle.

The sensor illustrated in FIG. 2 is identical in structure to the device of FIG. 1 with the addition of a static pressure pickup tube 22, its pickup 24 located near the fluid inlet port 15, and a connection (not shown) to a suitable gage 23 that measures the differences in the pressures taken from pickups 24 and 20.

The devices of FIGS. 1 and 2 are rigidly attached to a vehicle or other body with the axis A—A of the vortex chambers 11 parallel to the axis of rotation thereof. Upon rotation of the body about its axis, the vortex chamber 11 (including its nozzle 15) will rotate therewith, the result being that the tangential velocity of the fluid entering the chamber will be increased or decreased, depending upon the direction of rotation of the vortical flow, and the static pressure of the fluid in the chamber will correspondingly decrease or increase. Assuming a clockwise flow in the chambers of FIGS. 1 and 2 as shown by the arrows, if the device of FIG. 1 is rotated in a clockwise direction about its axis A—A the magnitude and the direction of rotation will be indicated by the absolute fall in the static pressure at 20 as measured by gage 21. In the case of the scheme of FIG. 2 having the additional pickup 24 near the inlet, the differential change in the fall of static pressure as measured by gage 23 will indicate the rate and direction of rotation.

With reference now to the embodiment of the invention shown in FIG. 3, the rotation sensor is generally indicated by the numeral 30, and consists essentially of a pair of stacked, fluid vortex amplifiers 31 and 32 of the type and general configuration of FIG. 1. The vortex chambers are mounted coaxially, fixed to each other and have their respective vortical axes aligned to form a single sensor axis B—B. As is the case of the sensors of FIGS. 1 and 2, sensor 30 is operatively connected to the body to rotate therewith and is to be mounted with its axes B—B parallel to an axis of rotation of the body.

Fluid under pressure is supplied to the chambers 31 and 32 from a common supply pipe 33 where it is directed, via conduits 34 and 35, to enter the chambers tangentially in opposite directions through nozzles 36 and 37. Each vortex amplifier 31, 32 has a static pressure pickup 38 and 39 respectively, located near the center of circular walls 40 and 41 respectively, and central fluid output or sink flow pipes 42 and 43 respectively. At the pickups 38, 39, the pressures are compared, and the system is adjusted to balance for zero output at a condition of no rotation. Should the system rotate about axis B—B in either direction, the tangential entrance velocity V in one chamber will increase and that in the other will decrease. Both changes in entrance velocities will be amplified by a fixed factor equivalent to the "gain" of the particular chambers, resulting in a corresponding pressure rise on one side and an equal pressure drop on the other. The degree of unbalance, as measured by a differential pressure gage 43, is an indication of the rate and direction of rotation of the device. As an alternative to gage 43, the pressure connections 44 and 45 can be fed directly to a pure fluid amplifier such as the type described in the U.S. Patent No. 3,122,165 to B. M. Horton. Also, since the total-flow of the chambers 31, 32 varies, the entire outputs from sing flow pipes 42, 43 can be employed as control jets for a fluid amplifier of the aforementioned Horton type.

For the stacked chamber arrangement of FIG. 3, it can be shown that as a result of rotation of the system about axis B—B, the difference in static pressures near the inputs of the individual chambers is equal to $2\rho V \Delta V$ where $\rho$ is the density of the fluid; V is the input velocity, and $\Delta V$ is the change in input velocity as a result of rotation. At the outputs, the difference would be equal to $2\mu \rho V \Delta V$ where $\mu$ is the "velocity amplification factor," or the ratio of the input to output radii.

The relation of the static pressure near the inputs of each chamber may be expressed as $$P_1 - P_2 = \tfrac{1}{2}\rho V_2^2 - \tfrac{1}{2}\rho V_1^2$$

in that the total pressure applied is common to both chambers. Since the velocity change due to rotation is positive in one chamber and negative in the other, $$P_1 - P_2 = \tfrac{1}{2}\rho(V - \Delta V)^2 - \tfrac{1}{2}\rho(V - \Delta V)^2$$

For incompressible fluids $\rho$ may be neglected, and if $p_1$ and $p_2$ are taken near the outputs the velocity amplification of the chambers should be included to yield $$\begin{aligned}p_1 - p_2 &= \tfrac{1}{2}[\mu(V-\Delta V)]^2 - \tfrac{1}{2}[\mu(V-\Delta V)]^2 \\ &= \tfrac{1}{2}[(\mu V)^2 + 2\mu V \Delta V + (\mu \Delta V)^2] \\ &\quad - \tfrac{1}{2}[(\mu V)^2 - 2\mu V \Delta + (\mu \Delta V)^2] \\ &= 2\mu V \Delta V\end{aligned}$$

In the devices of FIGS. 1 and 2, the dynamic pressures near the outputs are functions of $$\tfrac{1}{2}\rho(\mu V)^2$$

for the non-rotating case and of $$\tfrac{1}{2}\rho[(\mu V)^2 \pm \mu V \Delta V + (\mu \Delta V)^2]$$

under rotation. The static pressures are equal to the total pressures minus the dynamic pressures.

In the case of the sensor of FIG. 2, the output is being compared to the input, which is $$p_0 - \tfrac{1}{2}\rho V^2$$

at rest and $$p_0 - \tfrac{1}{2}\rho(V \pm \Delta V)^2$$

under rotation.

An important advantage of the tangential-injection rotation sensors above, over that of the radial-injection rotation detection devices of the type disclosed in the copending Bowles application supra, is that the static and dynamic pressure relations which are to be measured are not only a function of the ratio of the input-to-output radii, but are also a function of the tangential input velocity. Furthermore, the double chamber arrangement of FIG. 3 is a push-pull device and therefore offers balanced output signals and increased sensitivity.

In addition to the above advantages, there are several other facets of interest concerning the characteristics of the above novel designs:

(1) It is not necessary to differentiate between radial and tangential flow, velocity, pressure, etc. at the output;

(2) They can be used in conjunction with dynamic-pressure recovery devices as well as static-pressure recovery devices; and (3) Since the total-flow of the chambers of the sensor of FIG. 3 varies, it is possible to employ the entire output (rather than a tapped portion of the output) to a proportional fluid amplifier.

It will be apparent that the embodiments shown are only exemplary and that various modifications can be made in construction and arrangement within the scope of the invention as defined in the appended claims.

I claim as my invention:

1. A pure fluid rotation sensor for detecting the rotation of a body relative to an axis of rotation, comprising chamber means adapted to have a fluid vortex flow maintained therein, with
the axis of said vortex flow being parallel to said axis, and
means responsive to changes in the flow of fluid in said chamber means for indicating the rate and direction of rotation,
upon rotation of said body about said axis.

2. The sensor as set forth in claim 1 wherein said chamber means comprises a pair of vortex chambers characterized by said vortex flow of fluid being maintainable in a clockwise direction in one of said chambers and a counter-clockwise direction in the other.

3. The sensor according to claim 1 wherein the fluid flow responsive means is disposed to measure changes in the static pressure of said fluid, by taking a static pressure measurement near the center of the vortex flow of fluid.

4. The sensor of claim 3, including,
 means for sensing and indicating changes in the static pressure of said fluid at a radius near the outermost portion of said vortex flow of fluid,
 means for comparing the differential pressure indications obtained between the indication provided near the center of said vortex and the indication provided near the outermost portion of said vortex flow,
 whereby the degree of said differential change in pressure is an indication of the rate and direction of said rotation.

5. A method of measuring the magnitude and direction of rotation of a body comprising the steps of:
 (a) injecting a fluid under pressure into a vortex chamber attached to a rotatable body in a tangential direction thereby establishing rotational flow therein;
 (b) measuring the static pressure of said flowing fluid in said chamber during a condition of non-rotation of said chamber about its vortical axis,
 (c) measuring the static pressure of said fluid flow in said chamber upon rotation of said chamber about said axis, and
 (d) comparing said pressure measurements to indicate the rate and direction of said rotation.

6. The method according to claim 5, wherein said static pressure measurements of said flowing fluid are taken near the center of said chamber along the axis of rotation, at the point of maximum response.

7. The method of claim 6 further comprising the steps of:

(a) taking static pressure measurements near the inlet of said chamber along said axis of rotation, and
(b) comparing the change in the differential pressure measurements obtained from said two locations before and during rotation of said chamber about said axis to detect the magnitude and direction of said rotation.

8. A method of measuring the magnitude and direction of rotation of a body including the steps of:
 (a) supplying a fluid under pressure to a pair of vortex chambers attached to a rotatable body, each having flow measurement means, a tangential inlet and a central discharge opening and having their respective vortical axis in alignment,
 (b) injecting said fluid tangentially into said chambers in opposite directions to establish counter-rotational flow in said chambers,
 (c) measuring the differences in the fluid flow between said chambers when said chambers are not rotating about their common vortical axis,
 (d) measuring the degree of change in the difference of said flow measurements obtained from said chambers resulting from rotation of said chambers about said axis,
 (e) whereby, said degree of change indicates the magnitude and direction of said rotation.

References Cited
UNITED STATES PATENTS

| | | | |
|---|---|---|---|
| 3,242,728 | 3/1966 | Reilly | 73—505 |
| 3,276,259 | 10/1966 | Bowles et al. | 73—389 X |
| 3,285,073 | 11/1966 | Egli | 73—505 |
| 3,290,947 | 12/1966 | Reilly | 137—81.5 X |

BENJAMIN A. BORCHELT, *Primary Examiner.*

W. C. ROCH, T. H. WEBB, *Assistant Examiners.*